April 3, 1934.                I. HECHENBLEIKNER                1,953,225
                              TREATMENT OF ACID SLUDGE
                              Filed Oct. 10, 1931          2 Sheets-Sheet 1
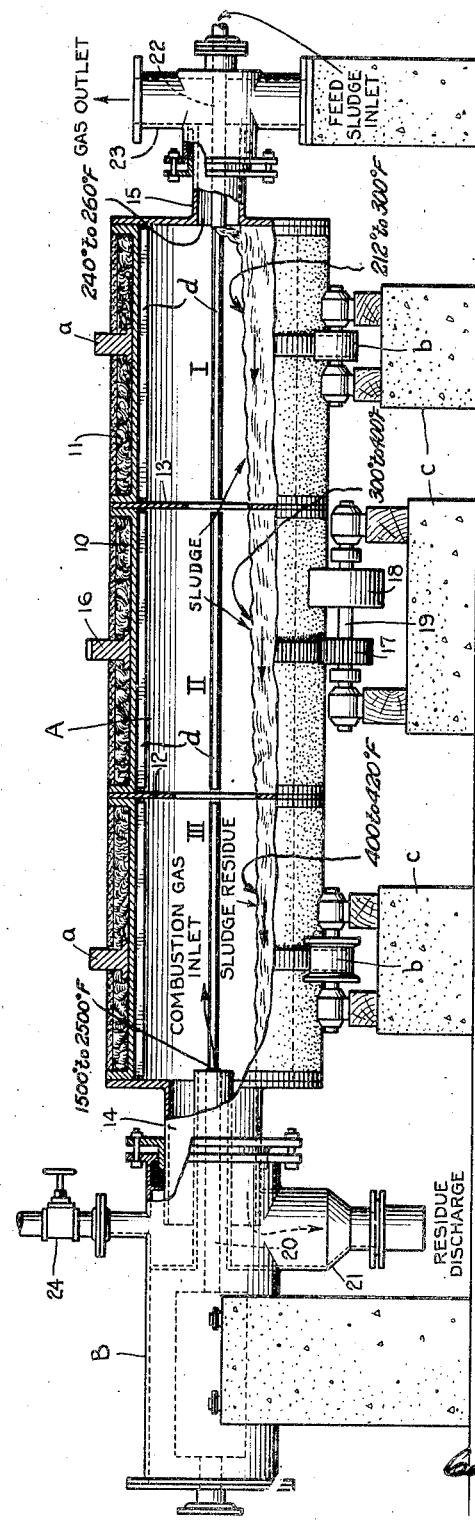
INVENTOR
INGENUIN HECHENBLEIKNER
BY
ATTORNEYS

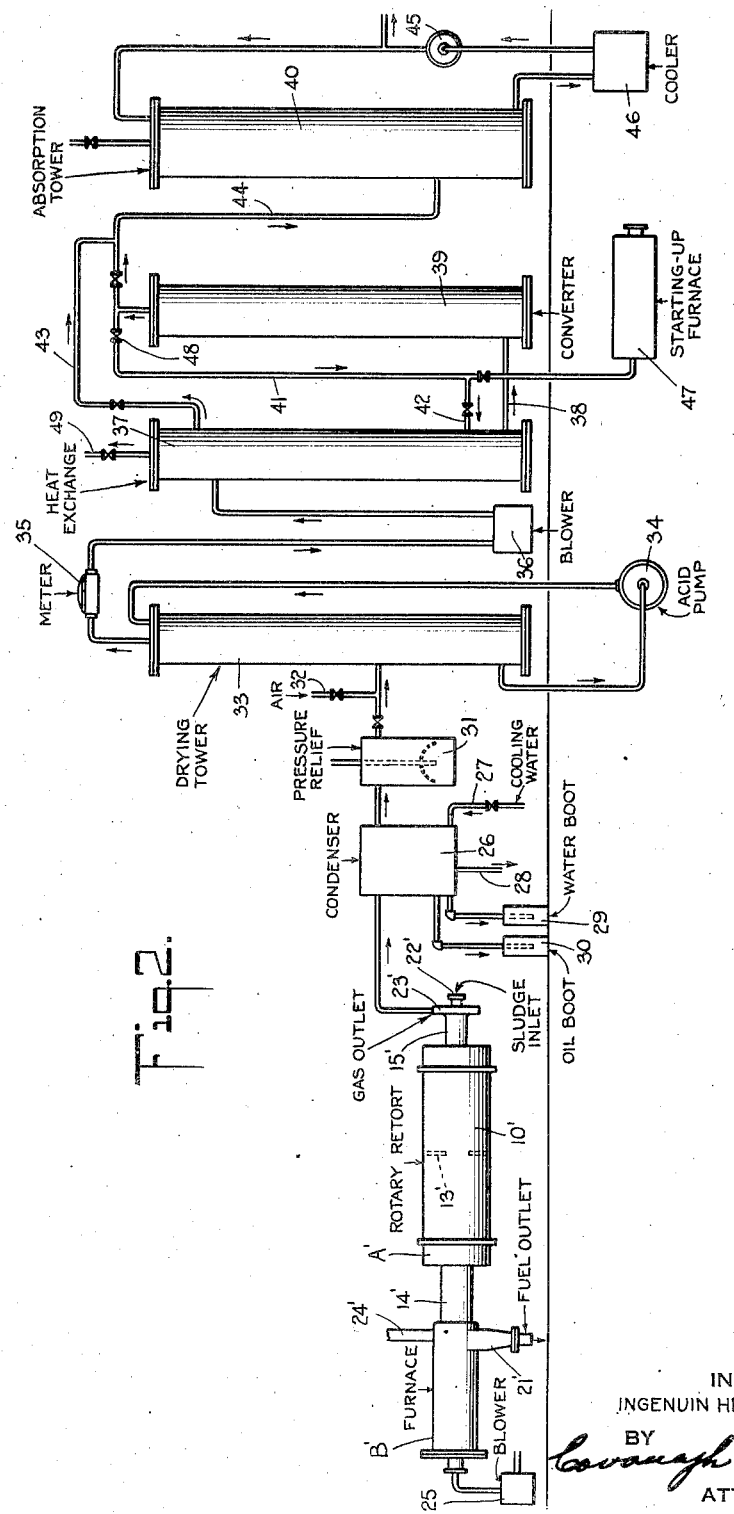

Patented Apr. 3, 1934

1,953,225

UNITED STATES PATENT OFFICE 1,953,225

TREATMENT OF ACID SLUDGE

Ingenuin Hechenbleikner, Charlotte, N. C., assignor to Chemical Construction Corporation, Charlotte, N. C., a corporation of Delaware Application October 10, 1931, Serial No. 568,050

29 Claims. (Cl. 23—177)

This invention relates to a method of treating acid sludge, and relates more particularly to a method of recovering or producing $SO_2$ from the sulphuric acid or its compounds in the sludge; and has special reference to the provision of an improved process for producing sulphur dioxide and a carbonaceous material from the sludge.

In the refining of petroleum, tar and other organic materials, the crude oil or its fractional or cracked distillates is treated with sulphuric acid or with oleum which tends to remove the undesirable compounds therein reacting therewith to form a mixture which is separated from the treated oil as a tarry sludge, known as petroleum or acid sludge. This sludge may contain sulphuric acid, sulphonic acids, sulphates, acid tars, and other organic hydrocarbons, the relative proportions of which differ in different sludges and vary according to the nature of the material treated and the strength of the sulphuric acid or oleum used in the treatment.

Various methods of recovering the sulphuric acid from the acid or petroleum sludge have heretofore been suggested and practiced. Among the methods heretofore suggested is that which consists in subjecting either acid sludge (unseparated sludge) or separated sludge acid to the action of heat in such manner as to decompose the sulphuric acid content or its compounds in the sludge, reducing the same to sulphur dioxide; which sulphur dioxide may be subsequently reconverted into sulphuric acid or sulphuric anhydride. While many variations of this method of producing or recovering the sulphur dioxide from the sludge have been suggested or proposed from time to time, none of them has to my knowledge been adopted practically or commercially because of the deficiencies or objections which have been found inherent in or which have usually accompanied the proposed practices of this method.

In these prior proposals, it has been suggested to subject the acid sludge (or separated sludge acid) to either direct or indirect heat treatment in a retort, with the object of effecting the decomposition or reduction of the sulphuric acid or the sulphate compounds therein to $SO_2$. This object, however, has heretofore been impossible of attainment without producing such side reactions as substantially vitiated the object or results intended to be produced or/and without such a complication of apparatus and method steps as rendered the method impractical or commercially unworkable. Generally considered, the side reactions resulted in the creation or generation with the produced $SO_2$ gas of solid and vapor impurities which were difficult to handle or remove and which necessitated the use of complicated and expensive filtering, scrubbing and burning equipment for treating these impurities. This treatment consisted in filtering the produced gases to remove dust entrained thereby in the retort, in scrubbing out water vapor, sulphuric acid vapors (mist), $SO_3$ and the heavier and lighter hydrocarbons distilled in the retort and carried over therefrom, and in burning gases consisting principally of hydrogen sulphide, carbon monoxide, the lighter hydrocarbon distillates and sublimed sulphur. Moreover, because of these and other complications, the sulphur dioxide gas produced was generally too weak for commercial use, the same being diluted with such gases as carbon dioxide, nitrogen and the other gaseous components and impurities left untreated by the scrubbers and burning apparatus. Some of these unremoved impurities also acted to "poison" the catalytic agent employed in the subsequent apparatus for re-converting the sulphur dioxide gases to sulphuric anhydride; and this further rendered the system as a whole commercially unworkable. Furthermore, the carbonaceous residue in the retort was so converted as by being destructively distilled by the process as to render the same relatively useless for fuel or other purposes. All of these drawbacks were present in the prior suggested variations of this method, variable only in number and degree with the particular variation suggested.

I have discovered that acid sludge may be controllably reacted in a retort to produce $SO_2$ gas of relatively high concentration and substantially free from either solid or vapor impurities, the gases produced consisting of $SO_2$ substantially free from tarry vapors, $H_2S$ gas, $SO_3$, S, and sulphuric acid vapors, and containing only water in the form of steam and a minimum amount of light hydrocarbons which may be removed with little difficulty. I have furthermore empirically found that the retort reaction may be so controlled as to produce a non-acid fuel in a highly desirable mechanical state which has a high volatile content. I have furthermore found that the reactions in the retort may be carried out to accomplish these desiderata by suitably controlling the reaction constituents and conditions, and that the process may be so organized as to permit a quick and ready control of these conditioning factors.

The provision of this improved method for the efficient generation of $SO_2$ gas and production of an acid-free fuel from acid sludge is therefore the prime object of my present invention.

To the accomplishment of this prime object and such ancillary objects as will hereinafter appear, my invention consists in the processes and the steps of the processes hereinafter more particularly described and sought to be defined in the claims; reference being had to the accompanying drawings which show present embodiments of apparatus employed in the practice of the process, and in which:

Fig. 1 is a front elevational view of the retort apparatus used in the practice of the process, with parts broken away to show the interior subdivision of the retort, and Fig. 2 is a diagrammatic layout of a plant showing how the retort apparatus may be employed in conjunction with other apparatus for re-converting the $SO_2$ gases to sulphuric acid.

The improved method of the present invention centers about the process steps of subjecting acid sludge in a retort to the action of heat so that the organic matter of the sludge is made to react upon the sulphuric acid or its compounds in the sludge to reduce the same to $SO_2$ gas, and of controlling the reacting constituents and the reaction conditions so as to generate the $SO_2$ gas without producing such side reactions as result in the cracking or distillation of the heavy hydrocarbons, the distillation of sulphur, the distillation of $SO_3$ or of sulphuric acid with the consequent formation of sulphuric acid mist, the formation of dust, or the ultimate formation or inclusion with the removed $SO_2$ gas of $H_2S$ gas, the reaction being moreover so carried out as to limit the formation to the minimum amount of the lighter hydrocarbons by distillation.

I have empirically determined that these process steps may be suitably practiced in a retort apparatus such as is shown, for example, in Fig. 1 of the drawings, and wherein a body of the petroleum or acid sludge itself (unseparated sludge) is subjected to an internal heat treatment, the internal heat treatment being preferably carried out by directly heating the sludge body with hot combustion gases. The retort apparatus as shown in Fig. 1 of the drawings preferably comprises an elongated drum-shaped retort A and a combustion apparatus B associated therewith, combustion gases generated in the apparatus B being injected under suitable pressure into the drum retort A for direct heating contact and reaction with a body of sludge with which the retort is charged.

The retort A preferably comprises a cylinder or drum generally designated as 10 made of iron or steel which if desired may be outwardly covered with a heat insulating material 11, which in turn may be encased in a cement or metal casing, as shown. The drum 10 is preferably interiorly subdivided by means of annular members such as 12 and 13 into a plurality of separate and inter-communicating compartments, three of which are exemplified in Fig. 1 of the drawings and designated as I, II and III. The drum retort 10 is provided at its opposite ends with reduced cylinder sections 14 and 15 respectively which serve for the ingress and egress of the reacting constituents and resulting products.

In the preferred practice of the process, the sludge charge in the retort 10 is caused to flow through the compartments I, II and III in seriatim and is thoroughly and continuously agitated as it moves through the compartments so that all parts of the charge are progressively reacted and acted upon by the heating medium. To accomplish these ends the drum retort is preferably mounted for rotation during operation, the drum being provided for this purpose with a gear 16 which is rotated by meshing engagement with a gear 17, bearing for rotation of the drum being provided by the supporting engagement of flanges a, a suitably spaced along the drum with grooved and other rollers b, b appropriately journalled in concrete spaced standards c, c forming the main bed of the retort apparatus. The gear 17 derives power from an external source transmitted to a pulley such as 18 fixed on the gear shaft 19. As the drum A is rotated, the sludge charge therein is agitated and moves from one compartment into the next at a controlled or predetermined speed. Preferably the charge is more thoroughly agitated or "kneaded" by providing flights d, d interiorly of the compartments (which elevate and drop the sludge mass during retort rotation) and by introducing iron rods or rails in the compartments which are in turn elevated by the flights and which drop onto the sludge body, acting to break up and pound the viscous body, and heavy sludge and carbonaceous residue as these are caused to flow through the compartments, and serving to prevent the same from caking, adhering to and building up on the walls of the retort and to facilitate the thorough and uniform treatment of the sludge body.

The construction and design of the retort apparatus may be varied within substantial limits, depending upon a number of factors and mainly upon the capacity of the plant. For a small plant (2 ton daily capacity) the retort 10 may for example have an inside length of 8 to 10 feet and an inside diameter of 2 feet. Such a retort may be subdivided into two or three separate compartments of equal dimensions. When subdivided into two compartments a single annular member is used. The internal diameter of the cylindrical end section 14 may be one foot; the diameter of the orifice of the annular member may be 12 to 10 inches; and the internal diameter of the cylindrical end section 15 may be 6 inches, these diameters being thus arranged in progressively decreasing and stepped relationship. The rotational speed imparted to the retort 10 may be of the order of 16 R. P. M. Two flights are preferably provided in each compartment parallel to the walls of the retort 10 and iron rails may also be provided in each compartment for the purpose aforedescribed. Such an apparatus has been successfully employed with combustion gases having an oxygen content of about 2% and liquid sludges have been treated therein, having approximately the following analysis: 53.3% $H_2SO_4$ by titration, 18.8% water, approximately 4% of volatile oils, and the balance heavy hydrocarbon compounds. The temperatures of the entering combustion gases of such a unit are preferably from 1500° to 2000° F.

As an example of a suitable retort construction having a larger capacity such as a 50 ton capacity, the retort 10 (made of cast iron or steel) may have a length of about 35 feet and an inside diameter of 4½ feet; the compartments I, II and III thereof may be of equal dimensions with the opening of the annular member 13 about 20 inches and the opening of the annular member 12 about 24 inches; the internal diameters of the cylindrical end sections 14 and 15 being respectively 30 inches and 12 inches. It will be noted here also that the diameters or sizes of the openings of the spaced elements 15, 13, 12 and 14 progressively increase in size, this facilitating the controlled flow of the sludge body and sludge residue to, through and from the retort chambers. If desired, the retort 10 may be also slightly inclined so as to further induce the flow of the sludge and residue through the retort. This flow, however, may be most desirably controlled by predetermining the orifice diameters of the elements 12—15 and by controlling the rotational speed of the retort. The rotational speed of such a unit may be 10 R. P. M. The temperatures of the entering combustion gases of such a unit are preferably from 1500° to 2000° F.

I have found that the aforesaid desired results of the present process may be attained by controlling the heat treatment of the sludge body and residue in the retort within given temperature ranges and under definite speed and reacting conditions. I have empirically ascertained that this may be most suitably governed and readily controlled by flowing heated gases over the agitated sludge body in the retort, the heated gases being introduced at one end of the retort, and by flowing feed sludge into the sludge body at the other end of the retort, the heated gases and the sludge body being thus brought into contact with each other by movement in generally countercurrent directions. The produced reaction gases are preferably withdrawn or expelled from the retort at the feed sludge intake end thereof and the solid residue of the sludge is preferably withdrawn or removed from the retort at the combustion gas intake end thereof, the combustion and reaction gases being therefore caused to flow through the retort in generally co-current directions.

The cylindrical end section 14 of the retort is therefore made to serve as the intake or entrant end for the combustion gases and the expulsion end for the carbonaceous residue, while the opposite cylindrical end section 15 of the retort is made to serve as the intake or entrant point for the feed sludge and as the exit or expulsion end for the $SO_2$ gas. The section 14 therefore is made to receive the nozzle 20 of the combustion apparatus B and is made to communicate with a hopper 21 for the discharge of the carbonaceous residue, which hopper is sealed at the bottom by means of a slide door or the like. The section 15 is in turn made to receive the feed sludge pipe 22 and is made to communicate with the gas outlet 23. Since the retort chamber 10 is rotatable, the joints between the retort A and the combustion apparatus B at one end and those between the retort and the gas outlet 23 at the other end are suitably packed with some stuffing material such as asbestos or the like, as clearly shown in the drawings. It is highly desirable to make these joints air tight so as to prevent the ingress of atmospheric air into the retort at either end or the loss of gases from the retort.

In the operation of the apparatus thus far described, a relatively weak feed sludge is introduced into the retort through the pipe 22 and into the body of sludge under treatment therein, which sludge body is thoroughly agitated and "kneaded" as it is rotationally moved with the retort and as the sludge body is progressively moved through the retort compartments I, II and III to the residue discharge end 14 of the retort. Hot combustion gases generated in the combustion apparatus B are introduced through the nozzle 20 into the retort and are caused to flow in the opposing direction through the retort chambers for bringing and maintaining the sludge and residue in the retort up to and at the desired temperatures. The reaction gases are caused or induced to flow through the chambers in the direction of combustion gas flow and out through the gas outlet pipe 23.

The essence of this process, as aforesaid, centers about the production and recovery of a commercially useful and treatable $SO_2$ gas and of an acid-free and useful fuel. By means of this apparatus and the operation described, I am enabled to carry out the heat treatment of the sludge uniformly in defined and graduated temperature zones, which zones may be generally said to correspond with the retort compartments I, II and III. It will be understood, however, that while I prefer to subdivide the retort into separate and communicating compartments by means of the annular members 12 and 13, an actual subdivision into separate compartments is not essential, an essence of the invention being the creation of definite as well as controllable reaction zones. The combustion gases may be introduced into the retort at a temperature of about 1600° F., and the flow of the feed sludge as well as the sludge body may be so controlled (along with the control of the combustion gas flow) as to create three zones of reaction, one for the evaporation of water and any light distillates, another for effecting the main reaction of the sludge to reduce the sulphuric acid and sulphate compounds therein to $SO_2$, and a third zone for the final disintegration of the sludge residue and the removal therefrom of any occluded or/and residual gases. I have found that a suitable test point in the creation of these zones is the swelling of the sludge in the compartments I and II, which swelling is the result of the release from the sludge body of the gases of reaction. In the zone of compartment I the temperature range may be, for example when treating a blended liquid sludge, from 212° to 300° F.; in the zone of compartment II this temperature range may be from 300° to 400° F.; while in the zone of compartment III this temperature range may be, for example, from 400° to 420° F.; these temperatures being those to which the sludge and sludge residue are heated by the combustion gases.

The reacting conditions obtained in the retort zones serve to explain the results produced by the process. The combustion gases used may be obtained with any suitable fuel, one that I have used being such city gas as is supplied in Charlotte, North Carolina. The combustion gases entering the retort may desirably contain a small percentage of oxygen, an oxygen content up to 6% having been employed by me with successful results. The combustion gases may be directly impelled into the retort under pressure produced by the blower apparatus associated therewith; and this pressure aids in inducing the flow of the resulting reaction gases through and out of the retort.

The main reaction of the organic matter of the sludge, the combustion gases and the sulphuric acid content of or compounds in the sludge takes place in and around the second reaction zone, although the evolution of $SO_2$ begins at the lower temperatures, the evolution taking place, however, with increasing power until the critical temperature range such as of the order of 380° to 420° F. in the aforementioned example is reached. The direct heating of the sludge body while the latter is in an agitated and broken up state accomplishes a uniform heat treatment and avoids local overheating with its consequent disadvantages in producing side reactions. I have found that with the reacting conditions in the retort, all of the reactable sulphur and the $H_2SO_4$ content and compounds in the sludge are converted and reduced to $SO_2$ gas, there being no $SO_3$ gas or sulphuric acid mist present in the exit gases. The exit gases are also found to be free of any sublimed sulphur. The produced $SO_2$ gases are of high concentration, such for example as 14% $SO_2$. The produced gases furthermore contain but a small amount of volatile oil and a minimum amount of light hydrocarbons which may be removed in the subsequent treatment of the gas by a simple form of condenser and scrubber.

In the reaction zone generally defined by compartment I, evaporation of the water content of the sludge takes place (as well as distillation of the lighter hydrocarbons) to the point at which the acid will react on the organic matter of the sludge. There results also in compartment I a sludge body having a sulphuric acid of high concentration, into which the weak feed sludge may be trickled or caused to flow without creating any foaming troubles (a well-known major problem in present commercial methods of treating these sludges). Moreover, the weak feed sludge as it mixes with the sludge body in the first compartment rapidly reaches the proper temperature conditions.

In the reaction zone generally defined by compartment II, the main reaction takes place as aforesaid; and this reaction takes place within a range of temperatures below that at which $SO_3$ is distilled off and below the temperature for the formation of $H_2S$ gas, and at a rate at which the generation of $SO_3$ is obviated. Under any conditions of operation, if $H_2S$ gas is formed in any of the retort compartments, I believe it is further reacted under the conditions therein with the ultimate result of its complete elimination. I believe that it is due to the maintenance of the conditions principally in the compartment II that in addition to these results, cracking or distillation of the heavier hydrocarbons or the distillation of sulphur is obviated or prevented.

In the reaction zone generally defined by compartment III, there takes place the final breaking up of the spongy, globular, carbonaceous residue with further applied heating, the remainder of sulphur dioxide mechanically held in the residue being here driven off and the residue being reduced to a granular fuel which comes out in a very desirable granular state capable of being readily made into powdered fuel, or by suitable treatment, briquetted. I have found that this fuel has a high amount of volatile content, the fuel analysis of certain residues showing as high a content as 65% of volatile matter. This latter I believe is due to the relatively low temperatures of disintegration employed in the retort. The sludge mass during treatment passes from a liquid stage to a plastic condition (when the swelling takes place) as it is progressively moved through the retort; and the fuel or carbonaceous residue does not quite lose this plastic condition so that it is expelled from the retort in a cohering yet granular state. This in itself I find to be of a great advantage, because it avoids the formation of dust and the carrying over of dust with the produced gases, and thus eliminates the necessity incident to prior methods of using filtering apparatus for filtering the produced gases. The fact that the produced gases have their exit point at an end of the retort opposite to the discharge end for the carbonaceous residue is also a factor in avoiding the troublesome problem of dust formation and entrainment of the dust by the resulting gases. The physical and chemical condition of the exiting carbonaceous fuel may be controlled by regulating the aforesaid conditioning factors of the process.

It is of great importance in the efficient and economical operation of the apparatus that the process is a continuous one, with the results produced readily controllable by regulating the operating conditions. Thus the temperature ranges in the reaction zones and the character of the end products may be readily obtained by adjusting or controlling either the flow of feed sludge to the retort or the heat generated in the furnace or both, and by adjusting the rotational speed of operation of the retort, all so that there is finally attained a balance in the adjustment which enables the operation to run smoothly and continuously. This enables, furthermore, a ready modification of the reacting conditions to suit the character of the sludge used. Acid sludges, as aforesaid, vary in character and contain sulphuric acid, sulphonic acids, sulphates, tars and oils in different relative proportions. I have found that the process of the present invention is readily varied and adaptable to all kinds of sludges including not only the liquid but also the very heavy and viscous sludges, and that the operating conditions may be readily adjusted to suit the particular kind or variety of sludge employed. A practical test point or index of the attainment of the correct operating conditions for the various sludges is the swelling of the sludge which takes place in the first and second reaction compartments.

Generally considered, it will be manifest that the production of a uniform substantially pure sulphur dioxide on the one hand and an acid-free fuel product containing the optimum fuel value on the other hand results from this controlled operation of the apparatus, and that this is generally dependent only upon carrying out the process in such a way that every particle of the sludge material is heated at a desired rate through the critical temperature range for decomposition of the sulphuric acid content and compounds therein, but not heated to a higher temperature at which the side reactions and objectionable distillations including the destructive distillation of the fuel would take place.

It has been my observation that the rate at which the sludge is brought up to the reaction temperature is important to avoid the formation of any accompanying sulphuric acid distillation By means of my present process the sludge body is gradually brought up to the higher temperatures, the gradual heating being a factor in avoiding such rapid heating or local overheating as causes a distillation of $SO_3$. The avoidance of the formation of $SO_3$ at any stage of the process is very important, since such $SO_3$ formation results in the creation of an acid mist which is a colloidal fume and which passes through the converter and the absorber (in the subsequent sulphuric acid producing apparatus) and out into the atmosphere, and creates a great nuisance. Moreover, if the catalytic converter contains a platinum contact mass, this $SO_3$ mist acts as a "poison" for the contact mass. I have found that the avoidance of $SO_3$ distillation is the result of a combination of reasons, comprising mainly first the fact that at the gas exit end of the retort the temperatures are too low for the distillation of $SO_3$, second, the fact that the range of reacting temperatures is suitably governed, and third, the fact that the rate of bringing up the sludge to the reaction temperatures is so controlled and gradual that the formation of $SO_3$ is inhibited, or if any is produced, it is reacted with the hydrocarbons to produce the reduction thereof to $SO_2$ so that ultimately no $SO_3$ accompanies the exit gases.

The combustion gases employed may be obtained from a variety of sources and may be produced for example from the burning of oil, powdered coal, coke or other heat producing materials. The combustion gases provide an atmosphere in the retort which aids in producing rapid as well as complete reduction and conversion of the sulphur containing compounds to $SO_2$. The combustion gases may and I believe should contain a proportion of oxygen, an oxygen content up to say about 10% being utilizable. It is my belief that the presence of free oxygen may inhibit the formation of $H_2S$ in the retort when it is operated at the critical temperature range. The combustion gases may also be obtained by burning sulphur or hydrogen sulphide or similar sulphur containing compounds or products. The copious evolution of the produced gases in or about the middle section of the retort in all probability provides a protective blanket between these combustion gases and the lighter hydrocarbons distilled off in compartment I of the retort. These combustion gases may have entering temperatures varying from 1500° to 2500° F., and exiting temperatures of 240° to 260° F.

The countercurrent method of flowing the sludge body and the combustion gases is found to be especially applicable to sludges which pass quickly through the tarry stage to a comparatively dry product. Operation on the countercurrent principle, besides resulting in the advantages heretofore mentioned, also effects a greater fuel efficiency since the proper heat exchange between the gases and the sludge body takes place throughout the length of the retort, the sludge body being gradually brought up to the higher temperatures and the combustion gases being gradually brought down to the lower temperatures as these are moved or passed in their opposing directions.

In Fig. 2 of the drawings, I show how the retort apparatus of the present invention may be employed in conjunction with other apparatus for conditioning the $SO_2$ gases produced and for converting the same to sulphuric acid. In this Fig. 2 a modified form of rotary retort is employed wherein the retort drum is shown subdivided only into two instead of three compartments. Otherwise the retort and furnace are substantially the same as that exemplified in Fig. 1 of the drawings and the parts thereof are designated by reference characters similar (but primed) to those employed in connection with Fig. 1 of the drawings. Associated with the furnace B' I also show here the blower 25 and a starting up stack 24' which latter I have found desirable to use in starting up the furnace B'.

The produced gases discharging from the retort and exiting at the gas outlet 23' are first led through a condenser 26 which may be cooled by water entering through the pipe 27 and passing out through the pipe 28. In this condenser the water and the small amount of oil present in the exit gases are condensed, and these separating into stratified layers are readily withdrawn into the water and oil boots 29 and 30. This condenser is substantially the only equipment needed for conditioning the gases for conversion to sulphuric anhydride. If desired a simple scrubber may also be employed for removing the small amount of lighter hydrocarbons which are distilled off in the retort. However, I have found it unnecessary to employ even such a scrubber. It will be particularly noted at this point that I am enabled by my process to eliminate the complicated extensive and expensive filtering, scrubbing and gas burning equipment which have heretofore been suggested in the prior processes above referred to.

If desired, in order to prevent an undue rise in the pressure in the plant or system, a pressure relief valve such as 31 may be employed following the condenser 26.

The remainder of the plant apparatus illustrated in Fig. 2 is intended for the subsequent conversion of $SO_2$ to sulphuric anhydride. Air for the oxidation of $SO_2$ is introduced at 32 into the gas line, and the gas and air mixture is then passed through the drying tower 33 which may be supplied with a stream of sulphuric acid moving countercurrent to the gas flow under the action of an acid pump 34, the sulphuric acid serving the purpose of drying the air and gas mixture. This mixture then passes through an orifice meter 35 into and through the blower 36 which acts in conjunction with the blower 25 of the furnace to cause or induce the gas flow through the system. From the blower the gas mixture is delivered to a heat exchange device 37 which functions to preheat the gases to bring them up to suitable conversion temperatures. It will be understood that the gases having passed through the drying tower are cooled to a temperature below the catalytic conversion temperature and therefore require reheating.

The air and $SO_2$ gas mixture pass from the heat exchanger 37 through the pipe 38 into a catalytic converter 39 of any suitable design or construction. The converted gases ($SO_3$) discharging from the catalytic converter 39 are then led into the absorption tower 40 and if desired a part of these gases may be bypassed through the pipes 41 and 42 into and through the heat exchanger 37 for the purpose of supplying the heating medium for the heat exchanger, and conversely for the purpose of cooling the $SO_3$ gases to the desired absorption temperatures. The cooled $SO_3$ gas then returns through the pipe 44 leading to the absorption tower 40. In the absorption tower 40 the converted $SO_3$ is absorbed in the usual manner by means of acid which is supplied by a pump 45. The sulphuric acid produced in the absorption tower is led therefrom into the cooler 46.

In starting up the converter apparatus, a starting up furnace 47 may be utilized, this starting up furnace functioning to supply hot products of combustion to the heat exchanger 37 through the pipe 42; and at such time the valve 48 in the pipe line 41 is closed. Until the heat exchanger acquires the desired temperature, these combustion products may be vented through the outlet 49 to atmosphere.

The practice of my improved process and the operation of the apparatus will in the main be fully apparent from the above detailed description thereof. It will be further apparent that many variations in the process as well as in the apparatus may be made without departing from the spirit of the invention as defined in the appended claims. It will be apparent that the equipment for conditioning the produced $SO_2$ gases for conversion and also the converting and absorption apparatus are merely typical of apparatus that may be employed in combination with the retort equipment where conversion of the gases is desired and are given here merely for the purpose of further exemplifying the advantages of the invention and the character of product produced thereby. It will be understood, for example, that the sulphur dioxide gas produced may be utilized in the manufacture of sulphites, liquid $SO_2$ and the like. While I have described the process for use with acid sludge (of different varieties) it will be understood that the process is also applicable to separated sludge acids, the advantages of the invention being more apparent when it is understood that the acid sludge itself can be treated in the retort apparatus of the present invention without requiring a preliminary separation of acid sludge into its oily and sludge acid constituents. Manifestly, the process may be used with other sludges or bodies containing a recoverable content of sulphur compounds or carbonaceous material of the kind herein described. It will be further appreciated that while I prefer to embody all of the principles of the invention in the apparatus and process as described, the process and apparatus may be widely varied to employ any one or a number of these principles in combination to effect any one or a number of the advantages flowing therefrom, all as I have attempted to define in the following claims.

The claims of the present application are directed to the process of the present invention. The retort apparatus of my present invention is separately described and claimed in my companion application Serial No. 568,051, filed October 10, 1931. The invention relating to the method of producing the acid-free fuel is separately set forth and claimed in my companion application Serial No. 571,775, filed October 29, 1931.

I claim:

1. The steps in the method of recovering or producing sulphur dioxide from sludge which consist in subjecting a body of the sludge directly to hot combustion gases under conditions which effect a reaction of the sludge body with a consequent reduction of the sulphuric acid content or compounds thereof to sulphur dioxide gas and formation of a carbonaceous residue and in removing the sulphur dioxide gas from the sphere of reaction and from the resulting carbonaceous sludge residue.

2. The method of recovering or producing sulphur dioxide from acid sludge which consists in agitating a body of the sludge, in subjecting the same directly to hot combustion gases under conditions which effect a reaction of the sludge body with a consequent reduction of the sulphuric acid content or compounds thereof to sulphur dioxide gas and formation of a carbonaceous residue and in removing the sulphur dioxide gas from the sphere of reaction and from the resulting carbonaceous sludge residue.

3. The continuous method of recovering or producing sulphur dioxide from acid sludge which consists in subjecting a body of the sludge directly to hot combustion gases to effect a reaction of the sludge body with a consequent reduction of the sulphuric acid content or compounds thereof to sulphur dioxide gas, in maintaining the reacting sludge body at controlled high temperatures, in continuously flowing feed sludge into said sludge body and in continuously removing the produced sulphur dioxide gas from the sphere of reaction and from the resulting carbonaceous sludge residue.

4. The continuous method of recovering or producing sulphur dioxide from acid sludge which consists in subjecting the same directly to the treatment of hot combustion gases, in carrying on the treatment so as to maintain the sludge body at high temperatures within a controlled range, whereby the sludge body is reacted to produce a reduction of the sulphate content thereof to sulphur dioxide gas and the conversion of the carbonaceous content thereof to a fuel, in continuously flowing feed sludge into said sludge body and in continuously removing the produced sulphur dioxide gas and from the fuel residue from the field of reaction and from the fuel residue.

5. The method of claim 4 wherein the sludge body is continuously being agitated or "kneaded" as it is being reacted.

6. The method of recovering or producing sulphur dioxide from acid sludge which consists in subjecting the sludge to an internal heat treatment to effect a reaction thereof with a consequent reduction of the $H_2SO_4$ content or compounds of the sludge to $SO_2$, and in controllably maintaining the heat treatment within a temperature range of from about 212° to 420° F. to effect the optimum production of $SO_2$ substantially without the formation of any accompanying $SO_3$ or $H_2S$ gases.

7. The continuous method of recovering or producing sulphur dioxide from acid sludge which consists in subjecting an agitated body of sludge to a direct heat treatment of hot gases to effect a reduction of the $H_2SO_4$ content or compounds of the sludge to $SO_2$, in flowing feed sludge into the sludge body and in controlling the flow of the feed sludge and hot gases so as to uniformly maintain the heat treatment within a temperature range of from about 212° to 420° F. to effect the optimum production of $SO_2$ substantially without the formation of any accompanying $SO_3$ or $H_2S$ gases.

8. The method of recovering or producing sulphur dioxide from sludge which consists in subjecting the sludge to the direct heat treatment of hot gases to effect a reaction thereof with a consequent reduction of the $H_2SO_4$ content or compounds of the sludge to $SO_2$, and in controllably maintaining the heat treatment within a temperature range of from about 212° to 420° F. to effect the optimum production of $SO_2$ substantially without the side reactions incident to temperatures beyond the said range such as sulphuric acid or $SO_3$ distillation, cracking or distillation of heavy hydrocarbons or formation of $H_2S$.

9. The method of treating acid sludge which consists in subjecting the sludge directly to the treatment of a heating medium to reduce the $H_2SO_4$ content or compounds thereof to $SO_2$ and in carrying on the treatment by flowing the heating medium and the sludge into contact with each other in generally countercurrent directions.

10. The method of treating acid sludge which consists in subjecting a sludge body in a continuous state of agitation directly to the treatment of hot gases to reduce the $H_2SO_4$ content or compounds thereof to $SO_2$, in carrying on the treatment by flowing the hot gases and the sludge into contact with each other in generally countercurrent directions, and in continuously withdrawing the generated $SO_2$ from the sphere of reaction.

11. The method of recovering $SO_2$ from a sludge body containing sulphates which consists in subjecting the sludge body to the treatment of hot gases by continuously flowing the hot gases and the sludge body into contact with each other in generally countercurrent directions.

12. The method of recovering SO₂ from acid sludge which consists in flowing heated gases over an agitated body of the sludge, in flowing feed sludge into the sludge body at the exit end of the gas flow and in removing the solid residue of the sludge at the entrant end of the gas flow.

13. The method of recovering SO₂ from acid sludge which consists in flowing heated gases over an agitated body of the sludge in an elongated retort, the heated gases being introduced at one end of the retort, in flowing feed sludge into the sludge body at the other end of the retort and in removing the SO₂ and the solid residue of the sludge from the retort.

14. The method of recovering SO₂ from acid sludge which consists in flowing heated gases over an agitated body of the sludge in an elongated retort, the heated gases being introduced at one end of the retort, in flowing feed sludge into the sludge body at the other end of the retort, in removing the solid residue of the sludge at the said one end of the retort and in withdrawing the generated SO₂ from said other end of the retort.

15. The method of claim 22 in which the temperature zones in the retort are established and controlled by the control of the flow of the heated gases or/and the flow of the feed sludge at the opposite ends of the retort.

16. The method of treating sludge which consists in subjecting a body of the sludge directly to hot combustion gases under conditions which effect a reaction of the sludge body to reduce the H₂SO₄ content or compounds thereof to SO₂ gas, and forming a carbonaceous residue in flowing the combustion gases co-currently with the produced reaction gases, and in removing the reaction gases from the sphere of reaction and from the resulting carbonaceous sludge residue.

17. The method of treating acid sludge which consists in subjecting an agitated body of the sludge in an elongated retort directly to hot combustion gases under conditions which effect a reaction of the sludge body to reduce the H₂SO₄ content or compounds thereof to SO₂ gas and forming a carbonaceous residue in flowing the combustion gases co-currently with the produced reaction gases, and in removing the reaction gases from the sphere of reaction and from the resulting carbonaceous sludge residue.

18. The method of recovering SO₂ from acid sludge which consists in subjecting a sludge body in separate compartments to heat treatment, in flowing the sludge body during the treatment from a first compartment into another compartment, the said heat treatment being applied within a range of temperatures to reduce the H₂SO₄ content or compounds of the sludge to SO₂, the said heat being so applied that the sludge acid in the said first compartment contains acid of high concentration, in flowing feed sludge directly into said first compartment, and in removing the generated SO₂ from the compartments.

19. The method of recovering SO₂ from acid sludge which consists in subjecting a sludge body in separate compartments to direct heat treatment of hot combustion gases, in flowing the sludge body during the treatment from a first compartment into another, the said heat treatment being applied within a range of temperatures to reduce the H₂SO₄ content or compounds of the sludge to SO₂, the said heat being so applied that the sludge acid in the said first compartment contains acid of high concentration, in flowing feed sludge into said first compartment, and in removing the generated SO₂ from the compartments.

20. The method of recovering SO₂ from acid sludge which consists in subjecting a sludge body in separate compartments to heat treatment, in flowing the sludge body during the treatment from one compartment into the next, the said heat treatment being applied within a range of temperatures to reduce the H₂SO₄ content or compounds of the sludge to SO₂, the said heat being so applied that the acid in the sludge in the first compartment is of a high concentration and the material in the next compartment is weak in acid content, in flowing feed sludge into said first compartment, and in removing the generated SO₂ from the compartments.

21. A method of recovering SO₂ and carbonaceous contents from acid sludge which consists in subjecting the sludge to a heat treatment in increasing temperature zones through which the sludge is successively passed, one zone being maintained at a temperature range for evaporation of water and light distillates, another zone being maintained at a temperature range for final conditioning of the carbonaceous content of the sludge to a useful fuel, the passage through each zone being sufficiently slow so that the sludge remains in the zone for a sufficient time to substantially complete the operations to be performed in the zone and maintaining a sufficient flow of gaseous products over the surface of the sludge during treatment so that gaseous products volatilized from the sludge by the heat treatment are rapidly removed from the zone of reaction.

22. A method of recovering SO₂ and carbonaceous contents from acid sludge which consists in subjecting the sludge to direct heating by hot gases in a retort, the sludge being heated in increasing temperature zones in said retort through which zones the sludge is successively passed, one zone being maintained at a temperature range for evaporation of water and light distillates, another zone being maintained at a temperature range for reacting the sludge to reduce the H₂SO₄ content or compounds thereof to SO₂, and another zone being maintained at a temperature range for final conditioning of the carbonaceous content of the sludge to a useful fuel, the passage through each zone being sufficiently slow so that the sludge remains in the zone for a sufficient time to substantially complete the operations to be performed in the zone and maintaining a sufficient flow of gaseous products over the surface of the sludge during treatment so that gaseous products volatilized from the sludge by the heat treatment are rapidly removed from the zone of reaction.

23. A method according to claim 22 in which the volatile products from the heat treatment of the sludge and the carbonaceous residue are continuously removed from the retort.

24. A method according to claim 21 in which the sludge during the heat treatment is continuously agitated.

25. A method according to claim 22 in which the sludge during the heat treatment is continuously agitated.

26. A continuous method of recovering SO₂ from acid sludge which consists in flowing sludge in a state of agitation through an elongated retort, bringing heated gases into direct contact with the sludge in said retort and carrying on the said direct heat treatment of the sludge in a plurality of zones of increasing temperature through which zones the sludge passes successively, one zone being maintained at a temperature range for evaporation of water and light distillates, another zone being maintained at a temperature range for reacting the sludge to reduce the $H_2SO_4$ content or compounds thereof to $SO_2$, and another zone being maintained at a temperature range for final conditioning of the carbonaceous content of the sludge to a useful fuel, the passage through each zone being sufficiently slow so that the sludge remains in the zone for a sufficient time to substantially complete the operations to be performed in the zone and maintaining a sufficient flow of gaseous products over the surface of the sludge during treatment so that gaseous products volatilized from the sludge by the heat treatment are rapidly removed from the zone of reaction.

27. A method according to claim 21 in which the heat treatment is effected in a retort through which sludge is continuously caused to flow, the flow of sludge and heating medium being so controlled as to maintain the temperature zones.

28. A continuous method of producing or recovering sulfur dioxide from acid sludge which consists in subjecting a body of sludge to an increasing heat treatment in a plurality of temperature zones at least one of which zones is maintained at a temperature at which $SO_2$ is rapidly evolved by a reduction of the $H_2SO_4$ content or compounds of the sludge at temperatures below those which result in the formation of $H_2S$ or distillation of $SO_3$, the sludge being maintained in each temperature zone for a sufficient period of time to effect the operation to be carried out in said zone, and maintaining a sufficient flow of gaseous products over the surface of said sludge so that the gaseous products volatilized from the sludge by the heat treatment are substantially removed from the zone of reaction.

29. A method according to claim 28 in which the highest temperature zone is maintained at a temperature at which the carbonaceous residue of the sludge is conditioned to form a useful fuel

INGENUIN HECHENBLEIKNER.